United States Patent [19]
Koden et al.

[11] Patent Number: 5,539,546
[45] Date of Patent: Jul. 23, 1996

[54] FERROELECTRIC LIQUID CRYSTAL DISPLAY DEVICE IN WHICH PARTITION WALLS FORMED ON AN ELECTRODE CREATE DIFFERENTLY SIZED PARTITION AREAS FOR GRAY SCALE

[75] Inventors: Mitsuhiro Koden, Nara; Akira Tagawa, Kashiwara; Kazuhiko Tamai, Tenri; Tokihiko Shinomiya; Tomoaki Kuratate, both of Nara; Kohichi Fujimori, Nabari, all of Japan

[73] Assignee: Sharp Kabushiki Kaisha, Osaka, Japan

[21] Appl. No.: 329,630

[22] Filed: Oct. 26, 1994

[30] Foreign Application Priority Data

Oct. 29, 1993 [JP] Japan ................... 5-272430

[51] Int. Cl.⁶ .............................. G02F 1/1333
[52] U.S. Cl. ................ 359/51; 359/54; 359/81; 359/100
[58] Field of Search ............... 345/89; 359/51, 359/54, 61, 68, 100, 81

[56] References Cited

U.S. PATENT DOCUMENTS 4,639,089  1/1987  Okada et al. .................. 359/79
5,066,109  11/1991  Kuratate et al. ............... 359/93
5,317,437  5/1994  Katakura ....................... 359/54

FOREIGN PATENT DOCUMENTS

0552104A1  7/1993  European Pat. Off. .
3-174514   7/1991  Japan .
5-333324   12/1993  Japan ........................ 359/68

OTHER PUBLICATIONS

*Ferroelectrics*, 1991, vol. 122. pp. 1–26, "Ferroelectric Liquid Crystal Displays for Television Application".

Primary Examiner—Anita Pellman Gross
Assistant Examiner—Walter J. Malinowski
Attorney, Agent, or Firm—David G. Conlin; Brian L. Michaelis

[57] ABSTRACT

A ferroelectric liquid crystal display device comprises a pair of substrates having respective electrodes formed on opposed surfaces thereof, a ferroelectric liquid crystal sandwiched between the pair of substrates, a pixel formed between the opposed electrodes, and partition walls formed on the electrodes and dividing the pixel into differently-sized partition areas.

7 Claims, 9 Drawing Sheets

FERROELECTRIC LIQUID CRYSTAL DISPLAY DEVICE IN WHICH PARTITION WALLS FORMED ON AN ELECTRODE CREATE DIFFERENTLY SIZED PARTITION AREAS FOR GRAY SCALE

BACKGROUND OF THE INVENTION

1. Field of the Invention

The present invention relates to ferroelectric liquid crystal display devices and, more particularly, to ferroelectric liquid crystal display devices capable of gradational display.

2. Related Arts

Ferroelectric liquid crystals were discovered by Meyer et al in 1975. Thereafter in 1980, applications of ferroelectric liquid crystals to such device as surface-stabilized ferroelectric liquid crystal display device were proposed by Clark and Lagerwall. This ferroelectric liquid crystal display device, in which a ferroelectric liquid crystal having a chiral smectic C phase is sandwiched between a pair of substrates with a slight clearance as small as about 2 µm, utilizes a switching between two stable states provided by the ferroelectric liquid crystal. The switching is attributed to direct interaction between the spontaneous polarization of the ferroelectric liquid crystal and an electric field. Therefore, the response speed is very fast, typically, several dozens µsec, which is 1000 times faster than that of a nematic liquid crystal display device utilizing a dielectric anisotropy of a nematic liquid crystal. The ferroelectric liquid crystals also have a major characteristic of a memory effect. The combination of the memory effect and fast response will realize a liquid crystal display device with a high display capacity which has more than 1000 scanning lines.

The ferroelectric liquid crystals are expected to become next-generation liquid crystals, and are now being intensively researched. One of the major problems in a practical application of the ferroelectric liquid crystals is a difficulty in realizing a tradational display. The conventional approaches to the tradational display include area division, analog gradation, and time division (or multiplexing), for which many proposals and reports have been made. However, it has never been reported or proposed that ferroelectric liquid crystal display devices having a display capacity of multi-scale gradation such as full-scale gradation or 256-scale gradation were put into commercial use. One of the conventional approaches to gradational display was reported by W.J.A.M. Hartmann in Ferroelectrics, Vol.122, pp1–26 (1991).

Figure 12:
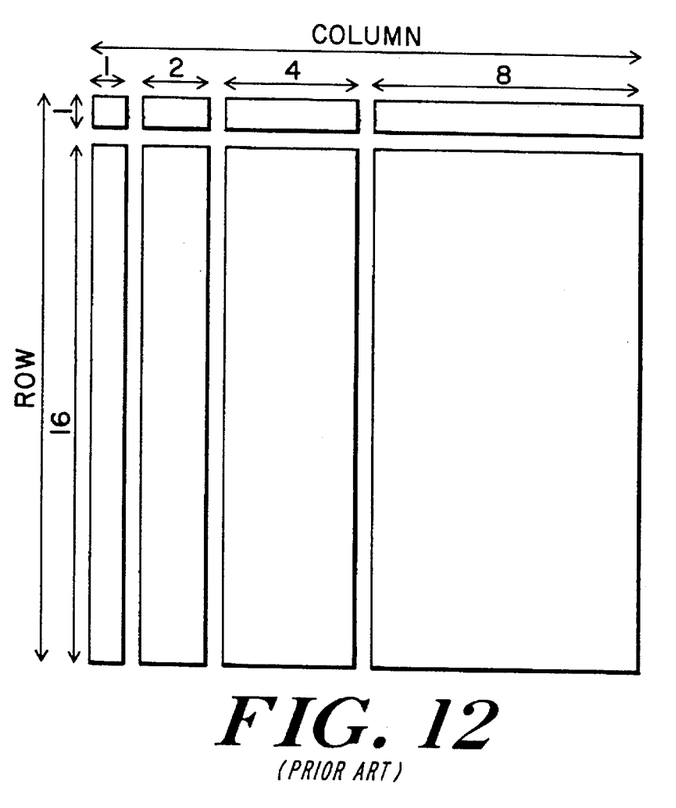
FIG. 12 is a diagram illustrating partition areas of a pixel according to a pixel division of a conventional 256-scale gradation display.

Among the aforesaid three approaches, the area division approach realizes a gray-scale display generated in accordance with an area ratio between bright portion and dark portion which appear on a pixel divided into plural areas by a given area ratio. To realize a 256-scale gradation, for example, one pixel is divided into partition areas by an area ratio of $2^0:2^1:2^2:2^3:2^4:2^5:2^6:2^7$, as shown in FIG. 12, Though the area division approach has an advantage that, the gradation is realized by using only one kind of liquid crystal, there exist the following disadvantages:

(1) Since a greater number of electrodes and LSIs for driving are required, the production cost rises (In a case as shown in FIG. 12, the number of LSIs for driving required on the side of scanning electrodes is two times greater, and that required on the side of signal electrodes is four times greater than a liquid crystal display device having no gradation display capability);

(2) In case that the width of electrodes is narrow, the resistance of the electrodes increases, thereby reducing the sharpness of the rise of signals; and (3) In case that matrix driving is employed for sequential operation of electrodes, fast writing speed is required (In the case shown in FIG. 12, the side of the scanning electrodes is divided into two portions and, therefore, the writing speed is required to be doubled).

Accordingly, this approach is not preferable to realize a multi-scale gradational display.

Another approach is disclosed in Japanese Unexamined Patent Publication No.3-174514 (1991) in which plural kinds of ferroelectric liquid crystals are utilized to realize a gradational display. In accordance with this approach, a plurality of partition walls are provided in a pixel between a pair of electrodes, and ferroelectric liquid crystals having different threshold voltages are filled in two or more partition areas of the pixel divided by the partition walls.

In this approach, it is essential that plural kinds of ferroelectric liquid crystals having different threshold voltages are employed depending on the number of gradational scales required for the gradational display. That is, this type of liquid crystal display devices requires an extremely complicated production process because plural kinds of liquid crystals are filled in the partition areas of the pixel, and will result in a higher production cost. Therefore, this approach is not preferable to realize a multiscale gradational display.

On the other hand, there has been proposed for the analog gradation a method of providing a gradational display by providing a gradient to the switching threshold of a ferroelectric liquid crystal filled in a pixel. However, no practical application has been realized yet.

In view of these circumstances, it has been desired to provide a ferroelectric liquid crystal display device which realizes a multi-scale gradational display with a single kind of ferroelectric liquid crystal and without increasing the number of electrodes.

SUMMARY OF THE INVENTION

In accordance with the present invention, there is provided a ferroelectric liquid crystal display device comprising a pair of substrates having respective electrodes formed on opposed surfaces thereof; a ferroelectric liquid crystal sandwiched between the pair of substrates; pixels formed between the opposed electrodes; and partition walls formed on the electrodes and dividing the pixels into differently-sized partition areas.

DESCRIPTION OF THE PREFERRED EMBODIMENTS

According to the present invention, a pixel defined by a pair of opposing electrodes is divided into differently-sized partition areas by partition walls, and the darkness or brightness of the pixel is varied depending on an electric field applied across the pixel. This means that the threshold voltage of a ferroelectric liquid crystal in each of the differently-sized partition areas differs depending on the size of the partition areas. Therefore, when a certain voltage is applied across the pixel, the liquid crystal in some partition areas is switched while the liquid crystal in the other partition areas is not switched. As a result, a gradational display can be realized on the whole pixel, which is a feature of the present invention.

Usually, a pair of electrodes are disposed on an insulated transparent substrate and on an insulated opaque substrate. The electrode formed on the insulated transparent substrate is a transparent electrode comprising an electrically-conductive thin film such as made of $InO_3$, $SnO_2$, or Indium Tin Oxide (ITO). The electrode formed on the insulated opaque substrate is a reflective electrode comprising an opaque electrically-conductive film such as made of Al, Ta, Mo, Ni, Au, Cu, or Cr. Besides, the above insulated opaque substrate may be replaced with an insulated transparent substrate.

Pixels are formed in portions where:

(1) a plurality of electrodes (e.g., scanning electrodes) formed in a striped configuration on the insulated transparent substrate cross a plurality of electrodes (e.g., signal electrodes) formed on the insulated opaque substrate in a striped configuration perpendicular to said electrodes; or (2) a plurality of dot-shaped reflective electrodes formed on the opaque insulated substrate opposes a transparent electrode formed on the entire surface of the transparent insulated substrate.

Though the size of the pixels differs depending on the size and shape of the electrodes, each pixel size is preferably between about $10^3$ $\mu m^2$ and about $10^6$ $\mu m^2$, more preferably between about 250 $\mu m^2$ and about $10^5$ $\mu m^2$.

Each pixel is divided into differently-sized partition areas by partition walls. More particularly, the pixel is bounded by partition walls and is divided into a plurality of differently-sized partition areas, for example, partition areas A, B, C and D, by partition walls. The division of the pixel into differently-sized partition areas is intended to obtain desired gradation scales provided by the ferroelectric liquid crystal filled in the partition areas of the pixel.

Next, the state of ferroelectric liquid crystal molecules in a partition area bounded by partition walls will be described. Ferroelectric liquid crystal molecules in the partition area are influenced by the partition walls bounding the partition area. That is, the ferroelectric liquid crystal molecules adjacent the partition walls interact with the partition walls. This impairs a switching characteristic between two stable states of the ferroelectric liquid crystal, and changes a threshold voltage $V_{th}$ for switching, depending on the size of the partition areas. That is, a smaller partition area is more influenced by the partition walls, and the threshold voltage $V_{th}$ thereof is increased. Accordingly, the differently-sized partition areas can have different threshold voltages $V_{th}$. Thus, a multi-scale gradational display can be realized by applying a voltage pulse signal of a desired waveform to the pixel which comprises differently-sized partition areas with different threshold voltages $V_{th}$.

What is essential is to change the threshold voltage $V_{th}$ by way of partition walls. It is not necessarily required, but is preferable to enclose all the partition areas with partition walls so as to exert an influence of the partition walls uniformly on the ferroelectric liquid crystal molecules.

The size of the largest partition area in one pixel is preferably such that substantially no influence of the partition walls is exerted on that area, and the size of the smallest partition area is preferably as small as the limit in the formation of the partition area. Though the size differs depending on the kind of applicable ferroelectric liquid crystals and display devices, the size of the largest partition area is preferably between $10^2$ $\mu m$ and $10^6$ $\mu m$, and that of the smallest partition area is preferably between $10^2$ $\mu m$ and $10^5$ $\mu m$.

The partition walls may be formed of any of various inorganic or organic materials which can influence the threshold voltage $V_{th}$ of the ferroelectric liquid crystal. Examples of the inorganic materials include $SiO_2$, $SiN_x$, $Ta_2O_5$, and $Al_2O_3$. Inorganic partition walls can be formed by way of patterning through photolithography. Examples of the organic materials include epoxy resins, acrylic resins, and novolak resins which are used for black matrixes. Organic partition walls can be formed by applying onto a substrate a polymer solution which is prepared by adding Merck's IRGACURE651 by 0.5 to 1 wt % to a solution containing 10 wt % lauryl/acrylate and 10 wt % stearyl/acrylate dissolved in a solvent and thereafter subjecting the substrate to light (12 mW/cm²) for 10 to 15 minutes to cure the polymer into a desired pattern.

Figure 1A:
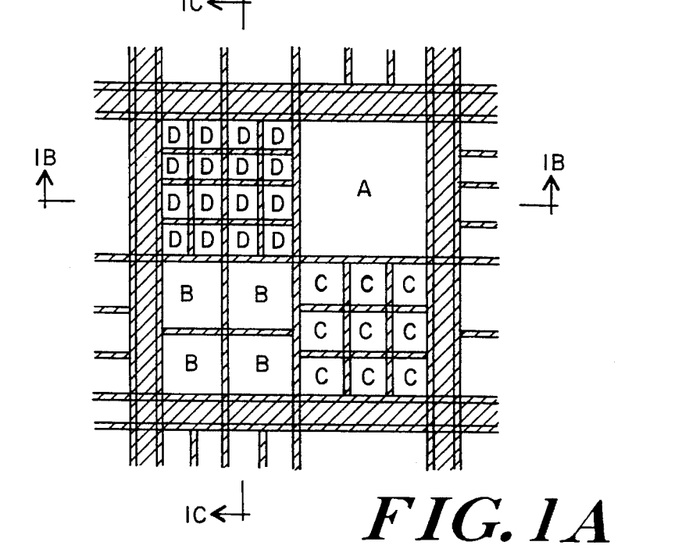
FIG. 1(a) is a schematic plan view of a pixel of a ferroelectric liquid crystal display device for illustrating the principle of the present invention.
Figure 1B:
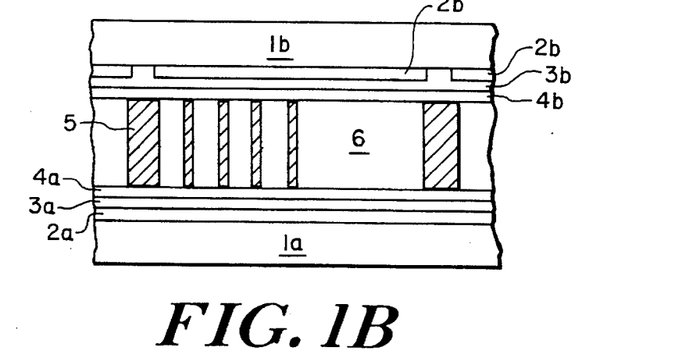
FIG. 1(b) is a schematic sectional view taken along the line X—X' of FIG. 1(a)
Figure 1C:
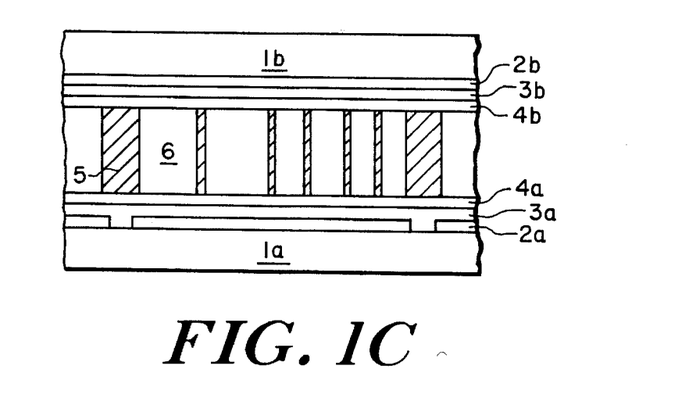
FIG. 1(c) is a schematic sectional view taken along the line Y—Y' of FIG. 1(a)

FIGS. 1(a) to 1(c) show a ferroelectric liquid crystal display device according to one embodiment of the present invention. FIG. 1(a) is a plan view of the ferroelectric liquid crystal display device viewed from the side of a substrate thereof. FIGS. 1(b) and 1(c) are sectional views taken along the lines X—X' and Y—Y', respectively, of FIG. 1(a). The ferroelectric liquid crystal display device shown in FIG. 1 includes substrates 1a and 1b, electrodes 2a and 2b, insulation films 3a and 3b, orientation films 4a and 4b, partition walls 5, and a ferroelectric liquid crystal 6. The ferroelectric liquid crystal display device shown in FIGS. 1(a) to 1(c) is fabricated in the following manner.

The substrates 1a and 1b are comprised of insulated transparent substrates such as silicon substrate, glass substrate and plastic film. A plurality of scanning electrodes 2a are formed in a striped configuration on the insulated transparent substrate 1a, and a plurality of signal electrodes 2b are formed on the insulated transparent substrate 1b in a striped configuration orthogonal to the scanning electrodes 2a. Pixels are formed in portions where the scanning electrodes 2a cross the signal electrodes 2b in a spaced opposite relation.

The substrates having electrodes formed thereon are optionally covered with insulation films 3a and 3b. Examples of the insulation films 3a and 3b include inorganic thin films such as made of $SiO_2$, $SiN_x$, $Ta_2O_5$ and $Al_2O_3$, and organic thin films such as made of polyimides, photoresist resins and polymer liquid crystals. An inorganic thin film as the insulation films 3a and 3b can be formed by way of evaporation, sputtering, chemical vapor deposition (CVD) or solution coating. An organic thin film as the insulation films 3a and 3b can be formed by applying a solution in which an organic compound is dissolved or a precursor solution by way of spinner coating, dip coating, screen printing or roll coating, and then curing under predetermined curing conditions (heating or irradiation of light). Alternatively, the organic insulation film can be formed by way of evaporation, sputtering or CVD, or directly by Langumuir-Blodgett (LB) method.

Orientation films 4a and 4b are formed on top of the electrodes 2a and 2b or the optionally formed insulation films 3a and 3b. In this embodiment, an orientation film may be formed on either one of the substrates or, if orientation films are formed on the both substrates, an orientation treatment may be made on either one of the orientation films. A well known method of forming an inorganic orientation film is an oblique or rotational evaporation of silicon oxide. Another method is a rubbing treatment on an inorganic film such as formed of $SiO_2$ or $SiN_x$ by way of evaporation. To form an organic orientation film, a rubbing treatment is made on a film such as made of nylon, polyvinylalcohol or polyimides. Alternatively, it is possible to realize an orientation by the use of a polymer liquid crystal, LB film, magnetic field, and spacer edge method.

Though the aforesaid rubbing treatment and oblique evaporation can be employed to form the orientation film, the rubbing treatment is more effective for mass production of ferroelectric liquid crystal display devices for large-scale screens. In the rubbing treatment, a rubbing operation is carried out on a preliminarily formed orientation film. Examples of rubbing treatment includes parallel rubbing method (a pair of substrates on which a rubbing operation has been carried out are bonded with each other so that a rubbing direction on one substrate is the same as that on the other substrate), anti-parallel rubbing method (a pair of substrates on which a rubbing operation has been carried out are bonded so that a rubbing direction on one substrate is opposite that on the other substrate), and single side rubbing method (a rubbing operation is made on only one substrate). Any of the aforesaid rubbing methods can be employed for the ferroelectric liquid crystal display devices according to the present invention.

Next, partition walls 5 are formed within a pixel. The formation of the partition walls 5 can precede the formation of the insulation films 3a and 3b and orientation films 4a and 4b. Of course, the partition walls 5 can be formed after the formation of the insulation films 3a and 3b and orientation films 4a and 4b.

In turn, a ferroelectric liquid crystal 6 is sandwiched between the substrates. Though plural kinds of ferroelectric liquid crystals 6 could be filled in the partition areas of the pixel, it is preferable in terms of economy and operability to use only one kind of a ferroelectric liquid crystal.

A ferroelectric liquid crystal composition to be used in the present invention can be prepared by blending liquid crystal compounds (I) and (II) shown below with known liquid crystal compounds or other compositions.

The liquid crystal compound (I) is a liquid crystal having a positive dielectric anisotropy ($\Delta\xi \sim 0$) such as phenylpyrimidine-based liquid crystal compounds. Conventionally available is Chisso's CS-1014 or a like liquid crystal compound.

The liquid crystal compound (II) is a liquid crystal compound having a negative dielectric anisotropy ($\Delta\xi < 0$), and has a high polarity functional group such as cyano group or fluoro group at the side chain thereof. Conventionally available is Merck's ZLI-5014 or a like liquid crystal compound.

A variety of additives can be blended with the ferroelectric liquid crystal composition, unless the additives impair the effects expected to be obtained by the present invention. For example, a liquid crystal compound having a fluoroalkyl group at the terminal thereof, a liquid crystal miscible compound, or dichroic dye (typically 0.01 to 1 wt %) can be blended with the ferroelectric liquid crystal composition. Any additives such as described in Japanese Unexamined Patent Publication No.3-47891 (1991) can be employed.

Examples of dichroic dyes include G214 and G241 for magenta, a blend of G282 and G232 for green, G282 and G279 for cyan, G205 and G156 for red, G232 and G143 for yellow, and G274 and G277 for blue, all of which are available from Nippon Kankoh-Shikiso Kenkyusho Co., Ltd.

The ferroelectric liquid crystal 6 is filled between the pair of substrates 1a and 1b, after spacers for controlling the thickness of a liquid crystal cell are dispersed between the substrates, which are thereafter bonded with each other. Alternatively, the ferroelectric liquid crystal 6 is applied onto or injected between the pair of substrates 1a and 1b after the partition walls 5 are formed on the substrate 1a, and then the substrates 1a and 1b are bonded together. In the former case, the diameter of the spacers is a little greater than the thickness of the partition walls 5, i.e., about 1 to 30 μm, and more preferably 1 to 15 μm. The spacers, even if included in the partition walls, do not impair the optical effect of the ferroelectric liquid crystal.

Figure 2A:
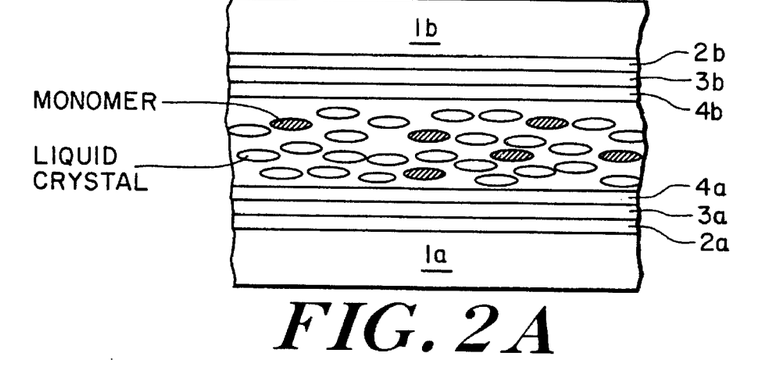
FIGS. 2(a) to 2(c) are schematic sectional views of a ferroelectric liquid crystal display device for explaining an example of a fabrication method according to the present invention.
Figure 2B:
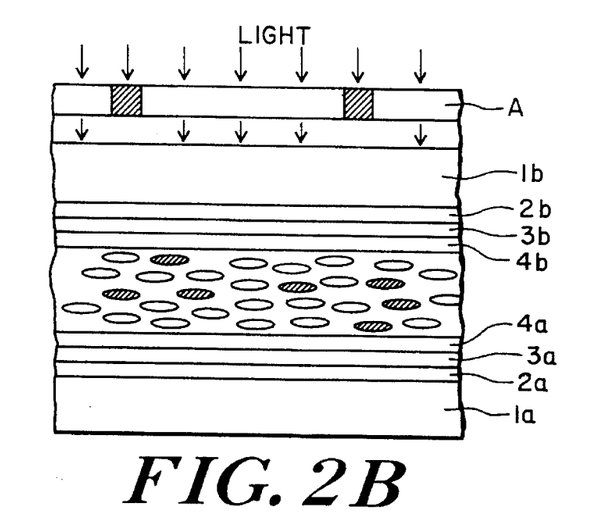
Figure 2C:
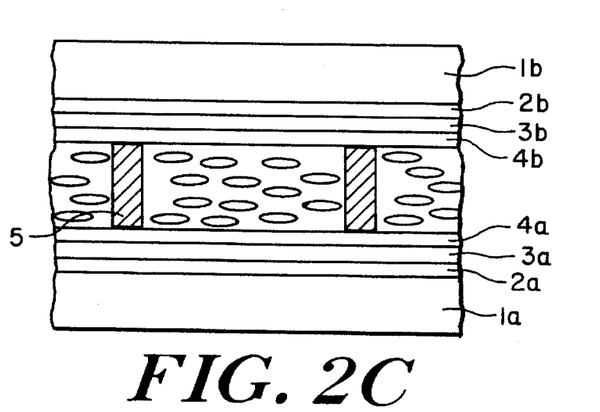

FIGS. 2(a) to 2(c) show another fabrication method of the ferroelectric liquid crystal display device according to the present invention. A ferroelectric liquid crystal composition comprising a ferroelectric liquid crystal compound and photo-polymerizable monomers such as acrylic monomers is sandwiched between the substrates 1a and 1b, as shown in FIG. 2(a). The ferroelectric liquid crystal composition may be injected into a ferroelectric liquid crystal cell from an edge opening thereof or, alternatively, may be directly sandwiched between the substrates. In this case, a polymerization initiator and surfactant may be optionally added to the ferroelectric liquid crystal composition. Then, the monomers in the ferroelectric liquid crystal composition are polymerized into a desired pattern by irradiating the ferroelectric liquid crystal composition through a photomask A, as shown in FIG. 2(b). Partition walls 5 are formed in the irradiated region through the polymerization of the monomers, and the ferroelectric liquid crystal in the region unexposed to the irradiation remains as it is, as shown in FIG. 2(c). Thus, the ferroelectric liquid crystal is sandwiched between the substrates, and the partition walls are formed.

The edge opening of the liquid crystal cell is sealed with a UV-curable resin such as acrylic resin. Further, a pair of polarization plates, if necessary, are disposed on the upper and lower faces of the liquid crystal cell with the polarization axes thereof orienting orthogonal to each other and with either one of the polarization axes being aligned with either one of the optical axes of the liquid crystal cell. Thus, the ferroelectric liquid crystal device is completed.

In this embodiment, the ferroelectric liquid crystal in one pixel is divided into differently-sized portions by the partition walls 5 without dividing the electrodes, as can been seen from FIG. 1 (a) to (c). FIG. 1(a) shows an embodiment of a liquid crystal display device for five-scale gradational display, in which the pixel is divided into four partition areas A, B, C and D, and the partition areas B, C and D are further divided into 4, 9, and 16 areas, respectively.

Figure 6:
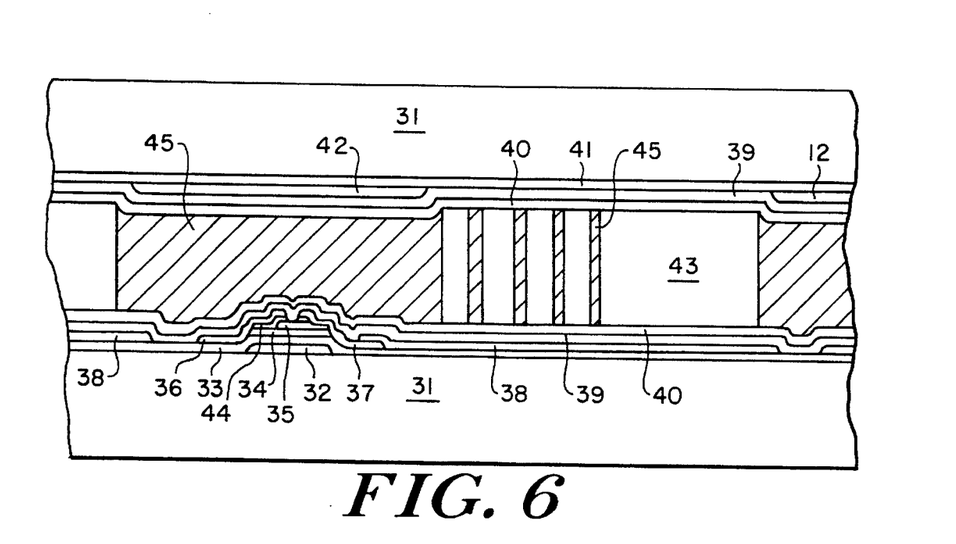
FIG. 6 is a schematic sectional view of a ferroelectric liquid crystal display device of active matrix type according to the present invention.

Another embodiment of a ferroelectric liquid crystal display device of the present invention is shown in FIG. 6. FIG. 6 is a sectional view of the ferroelectric liquid crystal display device having a combination of a ferroelectric liquid crystal and active matrix substrates employing thin film transistors (TFT) comprising an amorphous silicon (a-Si) semiconductor. In FIG. 6, the ferroelectric liquid crystal display device comprises substrates 31, and a TFT including a gate electrode 32, a gate insulation film 33, an a-Si semiconductor film 34, an insulation film 35, a source electrode 36, a drain electrode 37, a pixel electrode 38, insulation films 39, orientation films 40, a common electrode 41, an opaque film 42, a ferroelectric liquid crystal 43, an $n^+$-a-Si film 44 doped with phosphorus, partition walls 45. In this case, the provision of the opaque film 42 is optional, and either one of the orientation films 40 is treated with orientation treatment.

The ferroelectric liquid crystal display device shown in FIG. 6 can be used for color display by employing a color filter formed on the upper substrate 31.

Figure 9:
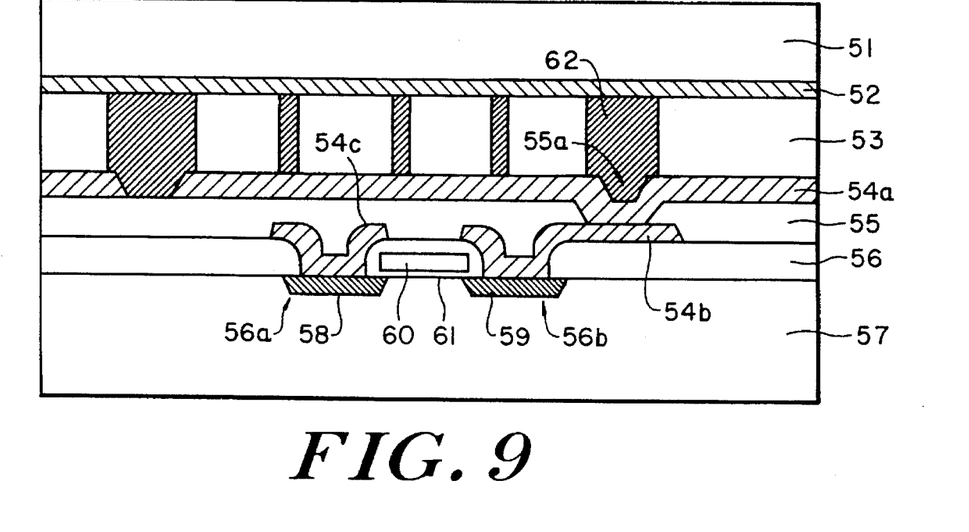
FIG. 9 is a schematic sectional view of a ferroelectric liquid crystal display device according to the present invention.

A reflection-type ferroelectric liquid crystal display device according to yet another embodiment of the present invention is shown in FIG. 9. This liquid crystal display device incorporates a switching circuit of a silicon gate NMOS formed on the substrate thereof.

The liquid crystal display device shown in FIG. 9 comprises a single crystalline silicon substrate 57 disposed at the bottom portion thereof and a field silicon oxide film 56 formed on the single crystalline silicon substrate 57. Two openings 56a and 56b are formed in the field silicon oxide film 56. A1 electrodes 54c and 54b respectively formed in the openings 56a and 56b extend from the top portion of the single crystalline substrate 57 to the surrounding areas of the openings 56a and 56b on the field silicon oxide film 56. A source region 58 and drain region 59 are formed in the single crystalline silicon substrate 57 below the A1 electrodes 54c and 54b, respectively.

A gate insulation film 61 and gate electrode 60 are disposed between the openings 56a and 56b. The gate electrode 60 is coated with a silicon oxide film to prevent the A1 electrodes 54c and 54b from being short-circuited. In this case, the gate electrode 60 is made of polysilicon.

A protection film 55 is formed on the A1 electrodes 54c and 54b, and the field silicon oxide film 56. The protection film 55 serves to protect a switching MOS circuit formed on the single crystalline silicon substrate 57.

An opening 55a is formed in the protection film 55 above the A1 electrode 54b. A reflective film 54a which also serves as an electrode is formed on the protection film 55 including the opening 55a so that a part of the bottom portion of the reflective film 54a contacts the A1 electrode 54b through the opening 55a. In this case, the electrode/reflective film 54a is made of A1 having a high reflectance. The electrode/reflective film 54a should thereafter undergo a heat treatment to reduce a contact resistance between the A1 electrode 54b and the electrode/reflective film 54a. However, the heat treatment roughens the surface of the electrode/reflective film 54a, thereby reducing the reflectance of the film. In this case, after the formation of the protection film 55 and after the heat treatment on the electrode/reflective film 54a, polishing treatments are made on the respective films to increase the reflectance of the electrode/reflective film 54a. On top of the electrode/reflective film 54a is formed an orientation film (not shown).

A transparent counter electrode 52 is formed on the entire lower surface of a transparent glass substrate 51. On top of the transparent electrode 52 is formed an orientation film (not shown). The transparent glass substrate 51 is disposed to face opposite the single crystalline silicon substrate 57. Thus prepared ferroelectric liquid crystal display device, of course, includes partition walls 62 and a ferroelectric liquid crystal 53 filled between the transparent glass substrate 51 and the single crystalline silicon substrate 57. The transparent glass substrate 51 is disposed on the side of light incident.

This embodiment employs the single crystalline silicon substrate. Therefore, the IC technology can be applied to fabricate the liquid crystal display device of this embodiment. That is, such highly advanced technologies as microfabrication, high-quality thin film formation, highly reliable doping, crystalline defect control, IC production and IC production apparatus, circuit designing, and CAD can be utilized. In addition, the ferroelectric liquid crystal display device of this embodiment can be produced along with ICs in a clean room at an existing IC production plant. Therefore, there is no need to newly invest in facility, thereby reducing costs.

According to the present invention, different driving methods such as direct-multiplexed driving, active matrix driving, and LSI driving may be utilized to apply various threshold voltages $V_{th}$ to pixels of a ferroelectric liquid crystal display device of the present invention.

In case of the direct-multiplexed driving, scanning electrodes are selected one by one, and pixels on the selected scanning electrode are switched one after another in a matrix pixel arrangement defined by combination of scanning electrodes and signal electrodes. One example of voltage application according to this driving method is shown in FIG. 5. In this case, the polarization plate is arranged so that the pixels display darkness when a negative voltage is applied across the bistable ferroelectric liquid crystal in the pixels (Two stable states of the liquid crystal is obtained when a positive voltage is applied and when a negative voltage is applied).

A voltage pulse signal of a waveform shown in FIG. 5(1) is applied to the selected scanning electrode, while a voltage pulse signal of another waveform shown in FIG. 5(2) is applied to the other scanning electrodes. The highest voltage $V_{s1}$ in the waveform shown in FIG. 5(1) ranges between 5 V and 60 V, preferably about 30 V. The lowest voltage $V_{s2}$ in the waveform shown in FIG. 5(1) is lower than the aforesaid highest voltage $V_{s1}$, e.g., about 20 V. Then, a voltage pulse signal of a waveform shown in FIG. 5(3) is applied to the signal electrodes in conformity with a display state of the pixels on the scanning electrodes. At this time, a voltage $V_{d1}$ is between 3 V and 60 V, preferably about 10 V. The pulse width of voltage pulse signal is between 10 and 500 μsec, preferably about 100 μsec. At this time, a voltage pulse signal of a waveform shown in FIG. 5(4) or FIG. 5(5) is applied to the pixels.

In this embodiment, a voltage pulse signal for one writing comprises six pulses. The first five pulses initialize the state of the pixel, whereby the pixel displays black. Therefore, the voltage $V_{s1}$ should be large enough to switch the state of the ferroelectric liquid crystal between two stable states. A voltage of the sixth pulse of the voltage pulse signal applied to the scanning electrode determines the area ratio between bright portion and dark portion of the pixel. The area ratio can be also controlled by a voltage $V_{d2}$ of the fifth or sixth pulse applied on the signal electrodes.

In case that the ferroelectric liquid crystal display device comprises pixels each having four differently-sized partition areas A, B, C and D, a five-scale gradational display can be realized by setting the voltage $V_{d2}$ to five different values which are smaller than the voltage $V_{d1}$. The smaller the size of the partition area, the greater the switching threshold voltage $V_{th}$. The threshold voltages $V_{thA}$, $V_{thB}$, $V_{thC}$, $V_{thD}$ for the partition areas A, B, C and D are as follows:

$$V_{thA} < V_{thB} < V_{thC} < V_{thD}$$

Thus, five gradational scales including above-mentioned black can be displayed on the pixel. The five-scale gradational display can be controlled by changing the pulse width and the voltage $V_{d2}$ also.

Unlike the conventional area division method, it is one of the features of the present invention that not the electrode but the ferroelectric liquid crystal in the pixel is divided. That is, there is no need to increase the number of electrodes in the ferroelectric liquid crystal display device of the present invention.

Figure 7:
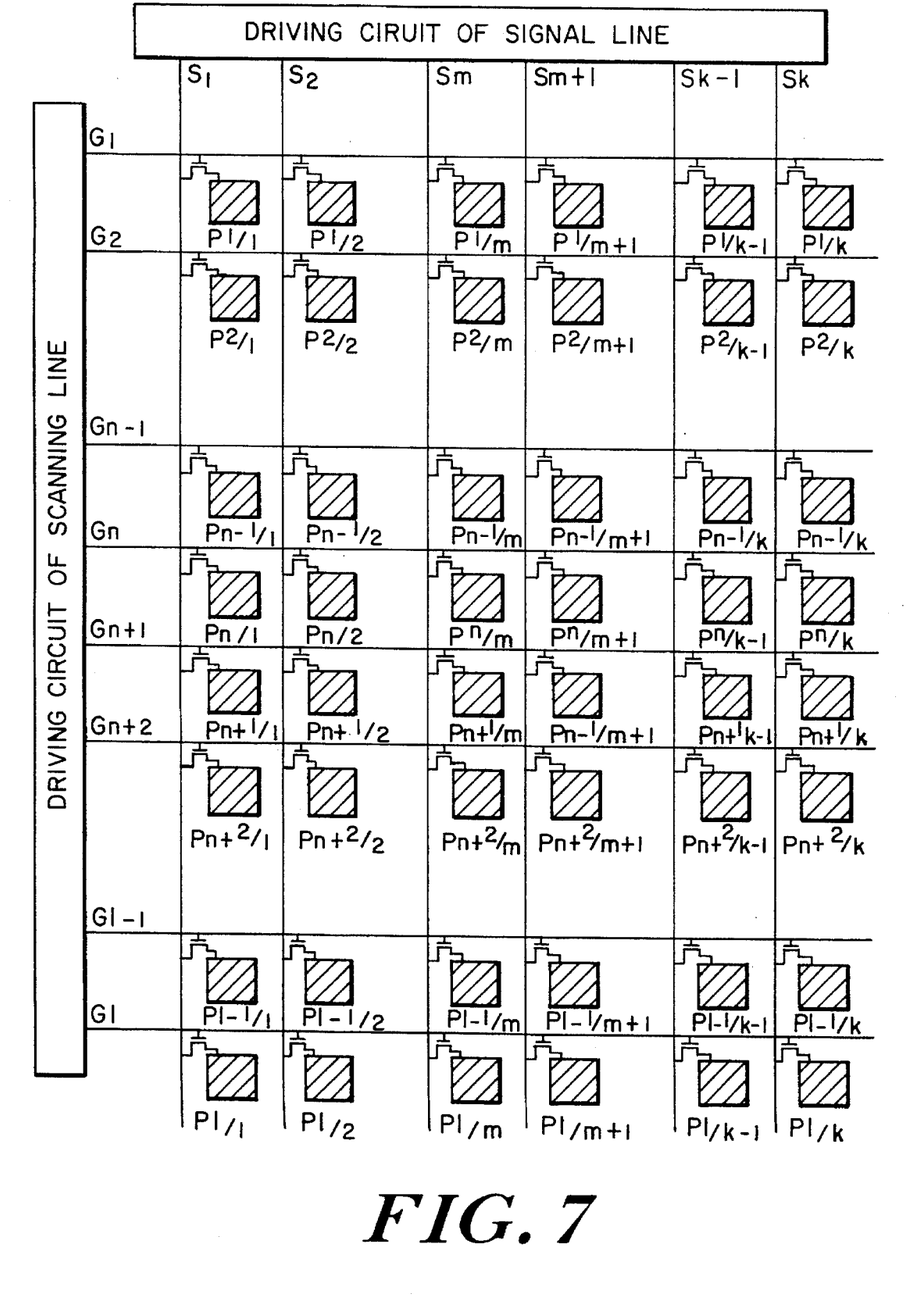
FIG. 7 is an equivalent circuit diagram of a ferroelectric liquid crystal display device of active matrix type according to the present invention.

As an example of the active matrix driving, the driving method employed for the TFT liquid crystal cell shown in FIG. 6 will be hereinafter described with reference to FIGS. 7 and 8. FIG. 7 shows an equivalent circuit of the active matrix liquid crystal display device employing TFTs. This active matrix liquid crystal display device comprises 1 scanning electrodes $G_1, G_2, \ldots G_{n-1}, G_n, G_{n+1}, \ldots G_{l-1}$, and $G_l$, and k signal electrodes $S_1, S_2, \ldots S_{m-1}, S_m, S_{m+1}, \ldots S_{k-1}$, and $S_k$ which are arranged in a matrix configuration, thin film transistors (TFTs) disposed on a substrate for active matrix driving at the intersections of the scanning electrodes and signal electrodes, and a ferroelectric liquid crystal. Gate electrodes and source electrodes of the TFTs disposed at the intersections are connected to the scanning electrodes and signal electrodes, respectively. Pixels $P_{1/1}, P_{2/1}, \ldots P_{n/1}, \ldots P_{l/1}, \ldots, P_{n/m}, \ldots$ and $P_{l/k}$ are connected to drain electrodes of the TFTs provided at the intersections. To drive the liquid crystal display device, a voltage pulse signal is sent from the scanning electrodes, and a voltage is applied to the gate electrodes G of the TFTs to turn ON the TFTs. In synchronization therewith, a voltage pulse signal is sent to the source electrodes of the TFTs from the signal electrodes, whereby a charge is accumulated in the liquid crystal in the pixels through the drain electrodes of the TFTs to generate an electric field. The liquid crystal responds to thus generated electric field.

Figure 8A:
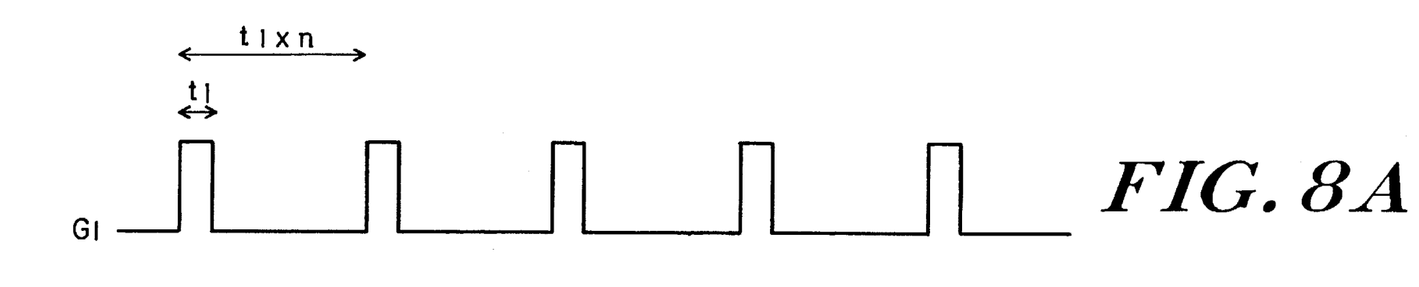
FIG. 8 is a voltage waveform chart for explaining an active matrix driving method of a ferroelectric liquid crystal display device according to the present invention.
Figure 8B:
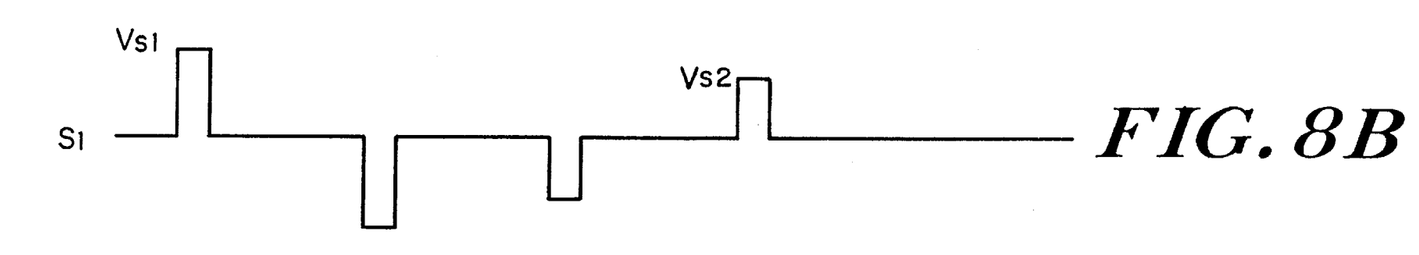
Figure 8C:
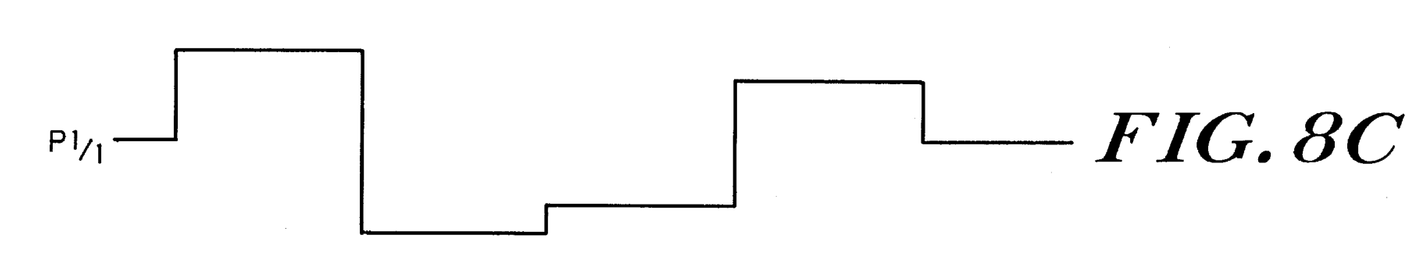

FIG. 8 shows an example of voltage waveform charts. When, for example, voltage pulse signals of waveforms indicated in FIG. 8 are respectively sent to the scanning electrode $G_1$ and signal electrode $S_1$, a voltage pulse signal of a waveform indicated by $P_{1/1}$ in FIG. 8 is applied to the pixel. In this case, the polarization plate is arranged so that the pixel displays white when a positive voltage is applied to the ferroelectric liquid crystal and displays black when a negative voltage is applied.

With reference to FIG. 8, an exemplary driving method will be described. First, TFTs connected to the scanning electrode $G_1$ are turned ON for a time period $t_1$ by sending a voltage pulse signal from the scanning electrode $G_1$. In synchronization therewith, a positive voltage $+V_{s1}$ is applied from the signal electrodes $S_1$ to $S_k$ connected to the pixels $P_{1/1}$ to $P_{1/k}$. Then, TFTs connected to the scanning electrode $G_2$ are turned ON during the next time period $t_1$ by sending a voltage pulse signal from the scanning electrode $G_2$. In synchronization therewith, the positive voltage $+V_{s1}$ is applied from the signal electrodes $S_1$ to $S_k$. By repeating this process, TFTs connected to the scanning electrodes $G_3$ to $G_n$ are turned ON one after another.

After a voltage pulse signal is sent from the n-th scanning electrode $G_n$, the TFTs connected to the scanning electrode $G_1$ are turned ON again for the time period $t_1$ by sending a voltage pulse signal from the scanning electrode $G_1$. In synchronization therewith, a negative voltage $-V_{s1}$ is applied from the signal electrodes $S_1$ to $S_k$ connected to the pixels $P_{1/1}$ to $P_{1/k}$. Then, the TFTs connected to the scanning electrode $G_2$ are turned ON again during the next time period $t_1$ by sending a voltage pulse signal from the scanning electrode $G_2$. In synchronization therewith, the negative voltage $-V_{s1}$ is applied from the signal electrodes $S_1$ to $S_k$. By repeating this process, the TFTs connected to the scanning electrodes $G_3$ to $G_n$ are turned ON again one after another.

Accordingly, a pulse voltage $V_{s1}$ is applied to the pixel $P_{1/1}$ for a time period of $t_1 \times n$ as shown in FIG. 8, thereby initializing the pixels into black state. This pulse voltage should be large enough to switch the state of the ferroelectric liquid crystal between two stable states.

After a voltage pulse signal is sent from the n-th scanning electrode $G_n$, the TFTs connected to the scanning electrode $G_1$ are turned ON again for the time period $t_1$ by sending a voltage pulse signal from the scanning electrode $G_1$. In synchronization therewith, negative voltages $-V_{s2}$ are applied from the signal electrodes $S_1$ to $S_k$ connected to the pixels $P_{1/1}$ to $P_{1/k}$. The value of the negative voltage $-V_{s2}$ to be applied differs for every signal electrode, and is determined by a desired display state of each pixel. In case that four differently-sized partition areas are formed in one pixel as shown in FIG. 1, five absolute values $|V_{s2}|$ of the voltage $-V_{s2}$ are prepared. Then, the TFTs connected to the scanning electrode $G_2$ are turned ON again during the next time period $t_1$ by sending a voltage pulse signal from the scanning electrode $G_2$. In synchronization therewith, negative voltages $-V_{s2}$ are applied from the signal electrodes $S_1$ to $S_k$. By repeating this process, the TFTs connected to the scanning electrodes $G_3$ to $G_n$ are turned ON again one after another.

After a voltage pulse signal is sent from the n-th scanning electrode $G_n$, the TFTs connected to the scanning electrode $G_1$ are turned ON again for the time period $t_1$ by sending a voltage pulse signal from the scanning electrode $G_1$. In synchronization therewith, positive voltages $+V_{s2}$ are applied from the signal electrodes $S_1$ to $S_k$ connected to the pixels $P_{1/1}$ to $P_{1/k}$. The value of the positive voltage $+V_{s2}$ to be applied differs for every signal electrode, and is determined by a desired display state of each pixel. In case that four differently-sized partition areas are formed in one pixel as shown in FIG. 1, five absolute values $|V_{s2}|$ of the voltage $+V_{s2}$ are prepared. Then, the TFTs connected to the scanning electrode $G_2$ are turned ON again during the next time period $t_1$ by sending a voltage pulse signal from the scanning electrode $G_2$. In synchronization therewith, positive voltages $+V_{s2}$ are applied from the signal electrodes $S_1$ to $S_k$. By repeating this process, the TFTs connected to the scanning electrodes $G_3$ to $G_n$ are turned ON again one after another.

After a voltage pulse signal is sent from the n-th scanning electrode $G_n$, the TFTs connected to the scanning electrodes $G_1$ are turned ON again for the time period $t_1$ by sending a voltage pulse signal from the scanning electrode $G_1$. In synchronization therewith, a voltage of 0 V is applied from the signal electrodes $S_1$ to $S_k$ connected to the pixel $P_{1/1}$ to $P_{1/k}$. Then, by repeating this process, the TFTs connected to the scanning electrodes $G_2$ to $G_n$ are turned ON again one after another and, in synchronization therewith, a voltage of 0 V is applied one after another from the signal electrodes $S_1$ to $S_k$.

The scanning electrodes $G_{n+1}$ to $G_{n+n}$ are scanned in accordance with the foregoing scanning process, and then this process is repeated until the l-th scanning electrode $G_l$ is scanned. Thus, the liquid crystal display device can be driven.

Figure 10:
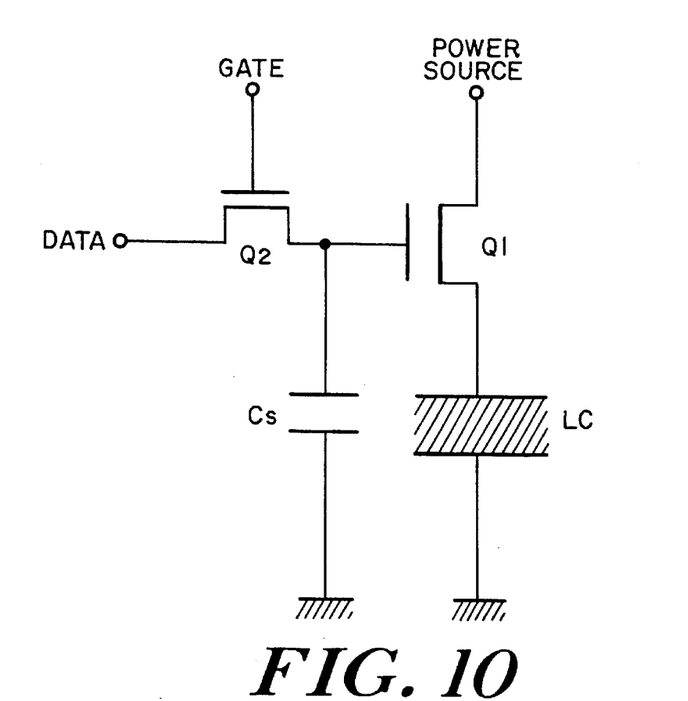
FIG. 10 is an equivalent circuit diagram of the device shown in FIG. 9.
Figure 11:
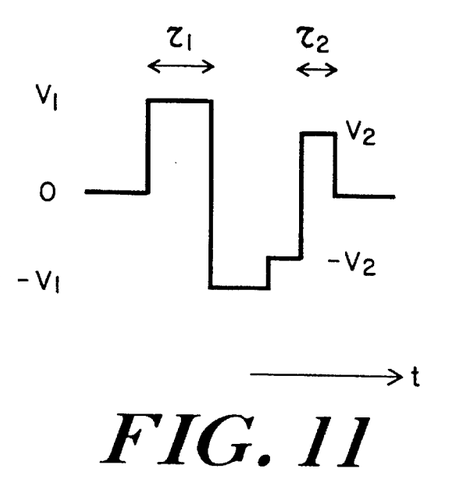
FIG. 11 is a voltage waveform chart for explaining a driving method of the device shown in FIG. 9.

FIG. 11 is a waveform chart for explaining an LSI driving, and FIG. 10 is an example of a switching circuit for driving liquid crystal. A transistor $Q_1$ serves to apply a voltage to a ferroelectric liquid crystal, and shows a voltage characteristic in which a gate potential and drain potential has a linear relation. The liquid crystal should have a dielectric strength to withstand a voltage directly applied when the liquid crystal is switched. A transistor $Q_2$ serves to supply a data signal to the transistor $Q_1$. The transistor $Q_2$ is desired to have little leak current at OFF. An auxiliary capacitor Cs serves to retain the data signal. When the transistor $Q_2$ is turned ON with a data signal being input from a data line and a voltage being applied to a gate line, the data signal is retained in the capacitor Cs simultaneously with the application of the data signal to the transistor $Q_1$. The transistor Q1 applies to the liquid crystal a voltage corresponding to the data signal to switch the liquid crystal.

The ON state of the transistor $Q_1$ is retained after the transistor $Q_2$ is turned OFF. Thus, even if the liquid crystal has a low resistance or great spontaneous polarization, the use of the switching circuit shown in FIG. 10 can realize an excellent display quality. According to this driving method, a voltage pulse signal of a waveform such as shown in FIG. 11 can be applied to the ferroelectric liquid crystal. The first two pulses, i.e., a pulse having a voltage of $-V_1$ and $V_1$ and a pulse width of $t_1$ bistably switches the ferroelectric liquid crystal to initialize the state of the liquid crystal into black state. The voltages $-V_2$ and $V_2$ and the pulse width $t_2$ of the next two pulses to be applied to the liquid crystal in the pixel vary depending on the brightness desired to be displayed by the pixel. In case that four differently-sized areas are formed in one pixel as shown in FIG. 1, five absolute values $|V_2|$ of the voltage $V_2$ are prepared.

EXAMPLE 1

A ferroelectric liquid crystal display device was fabricated in accordance with the fabrication method previously described with reference to FIG. 1. As shown in the sectional view thereof in FIG. 3(a), an ITO film 12a with a thickness of about 1000 Å was formed on a glass substrate 11a, and then patterned into a striped configuration with a line width of about 160 μm through photolithography to form electrodes. The glass substrate 11a having the patterned ITO film 12a formed thereon was laminated with an $SiO_2$ insulation film 15 with a thickness of about 1.5 μm, which was then patterned into a desired configuration through photolithography to form pixel boundaries and differently-sized partition areas. The plan view of the glass substrate 11a having the partition pattern is shown in FIG. 1(a). Then, a polyimide orientation film 14a (Chisso's PSI-A-2101) with a thickness of about 400 Å was applied on the glass substrate 11a having the partition pattern formed thereon, and a rubbing treatment was made thereon. The rubbing direction was parallel to the striped pattern of the ITO film 12a.

Figures 3A, 3B:
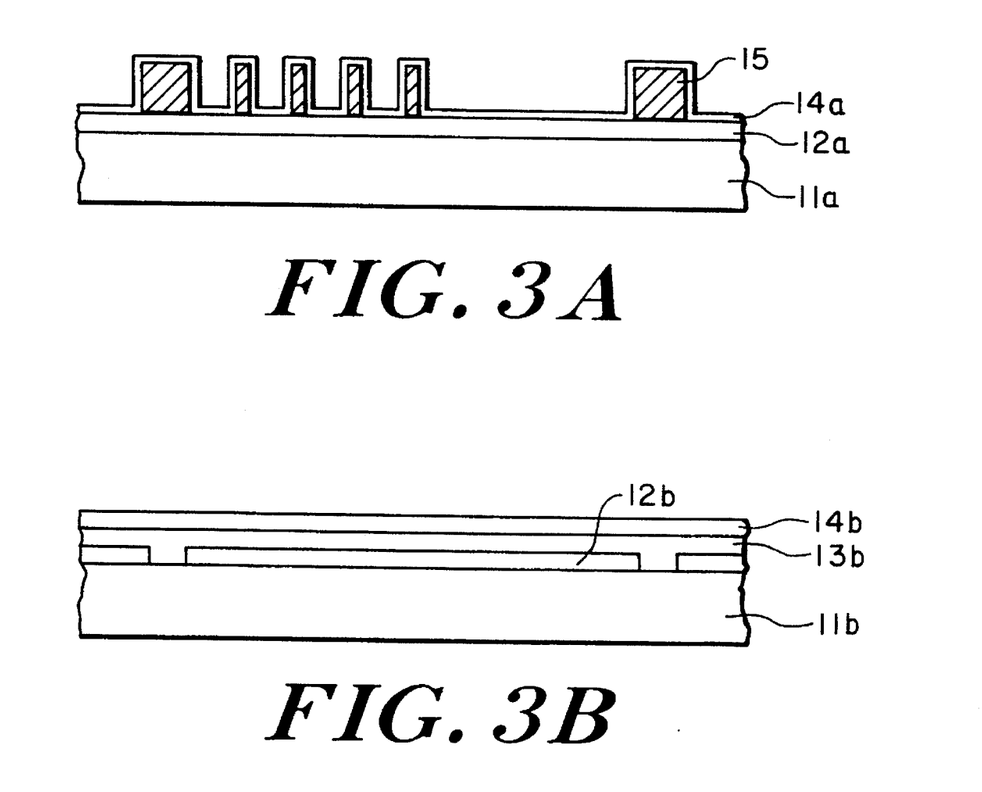
FIGS. 3(a) to 3(c) are schematic sectional views of a ferroelectric liquid crystal display device for explaining another example of a fabrication method according to another embodiment of the present invention.

As shown in FIG. 3(b), an ITO film 12b with a thickness of about 1000 Å was formed on a glass substrate 11b, and patterned into a striped configuration through photolithography to form electrodes, in substantially the same manner as described above. Then, the glass substrate 11b having the patterned ITO film 12b formed thereon was laminated with an $SiO_2$ insulation film 13b with a thickness of about 1000 Å, thereafter a polyimide orientation film 14b (Chisso's PSI-A-2101) with a thickness of about 400 Å was applied on the insulation film 13b, and a rubbing treatment was made thereon. Pixels were formed at the orthogonalities of the electrodes 12a formed on the substrate 11a and the electrodes 12b formed on the substrate 11b.

Figure 3C:
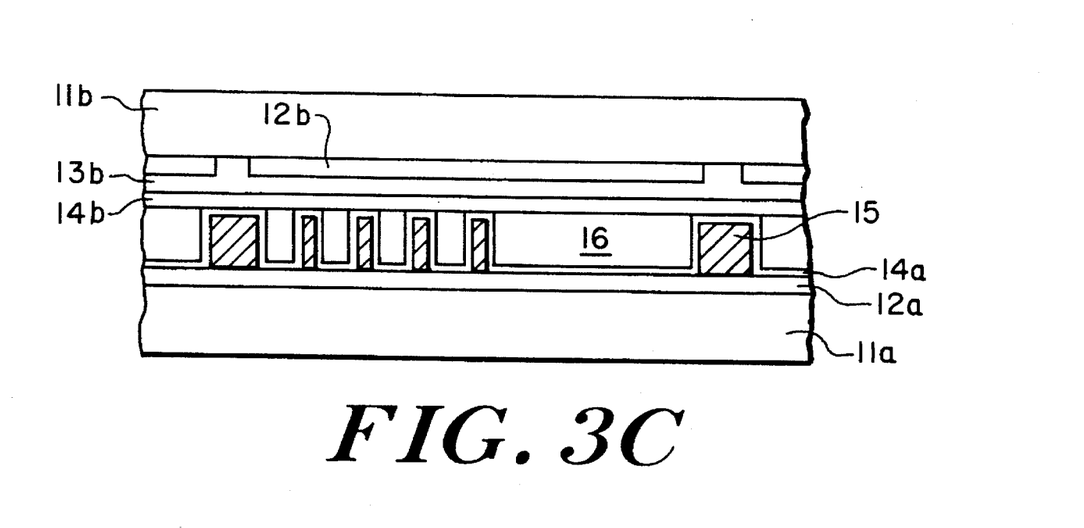

Next, a ferroelectric liquid crystal 18 (Merck's SCE-8) was sandwiched between the substrates 11a and 11b, and then the substrates 11a and 11b were bonded together so that the rubbing direction of the substrate 11a oriented parallel to that of the substrate 11b, with a moderate temperature being applied thereto. Thus, the ferroelectric liquid crystal cell shown in FIG. 3(c) was completed. The entire area of thus fabricated liquid crystal cell was enclosed, and divided into regions A, B, C and D having areas of 22,500 μm², 3,600 μm², 1,600 μm² and 400 μm² respectively with partition walls. When this ferroelectric liquid crystal cell was driven by voltage pulses of 20 V×150 μsec, 25 V×150 μsec, 30 V×150 μsec, and 45 V×150 μsec through the aforesaid direct multiplexed driving method, an excellent five-scale gradational display was observed.

EXAMPLE 2

A ferroelectric liquid crystal display device was fabricated in accordance with the fabrication method described with reference to FIG. 1. As shown in the sectional view thereof in FIG. 4(a), an ITO film 22a with a thickness of about 1000 Å was formed on a glass substrate 21a, and then patterned into a striped configuration with a line width of about 160 μm through photolithography to form electrodes. The glass substrate 21a having the patterned ITO film 22a formed thereon was laminated with an $SiO_2$ insulation film 23a with a thickness of about 1.5 μm, thereafter a polyimide orientation film 24a (Chisso's PSI-A-2101) with a thickness of about 400 Å was applied on the $SiO_2$ insulation film 23a, and a rubbing treatment was made thereon.

Next, a photoresist 25 (OFPR-800 available from Tokyo Ohka Kogyo Co., Ltd.) containing spacers with a diameter of 1.5 μm was applied on the entire surface of the polyimide orientation film 24a. Then the photoresist was exposed to light through a photomask and developed to be patterned into a desired configuration in order to form partition walls. The plan view of the glass substrate 11a having the patterned partition walls is shown in FIG. 1(a). At this time, a black colorant was blended in the photoresist to improve the light-shielding effect thereof, thereby effectively blocking light through non-pixel portions.

Figures 4A, 4B:
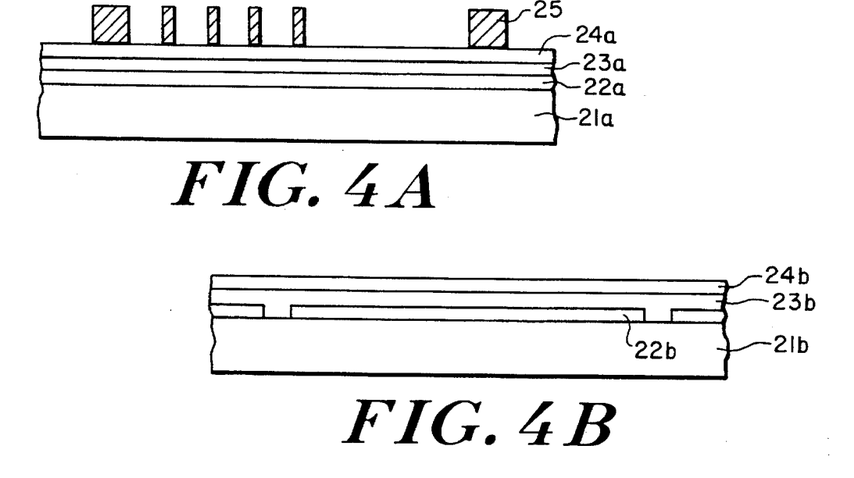
FIGS. 4(a) to 4(c) are schematic sectional views of a ferroelectric liquid crystal display device for explaining a yet another example of a fabrication method according to further another embodiment of the present invention.

As shown in FIG. 4(b), an ITO film 22b with a thickness of about 1000 Å was formed on a glass substrate 21b, and patterned into a striped configuration through photolithography to form electrodes. Then, the glass substrate 21b having the patterned ITO film 22b formed thereon was laminated with an $SiO_2$ insulation film 23b with a thickness of about 1.5 μm, thereafter a polyimide orientation film 24b (Chisso's PSI-A-2101) with a thickness of about 400 Å was applied on the insulation film 23b, and a rubbing treatment was made thereon.

Figure 4C:
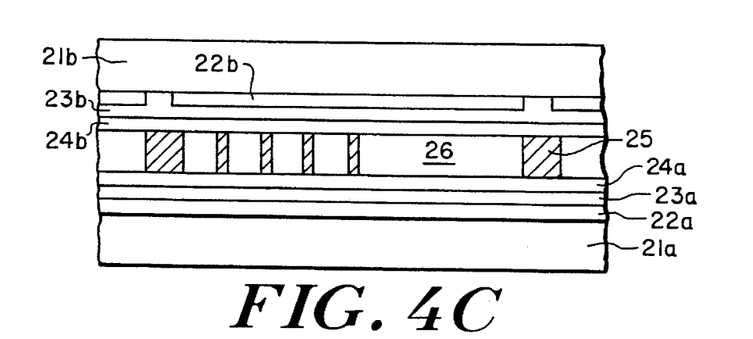
Figure 5A:
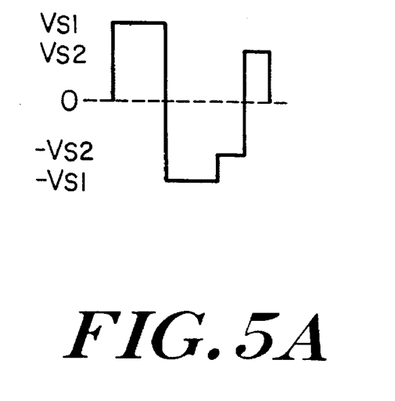
FIG. 5 is a voltage waveform chart for explaining a direct-multiplexed driving method of a ferroelectric liquid crystal display device according to the present invention.
Figure 5B:
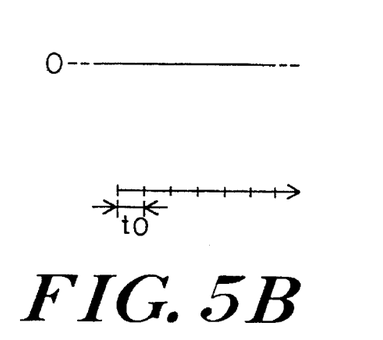
Figure 5C:
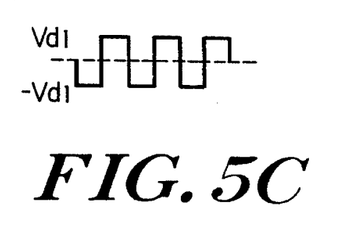
Figure 5D:
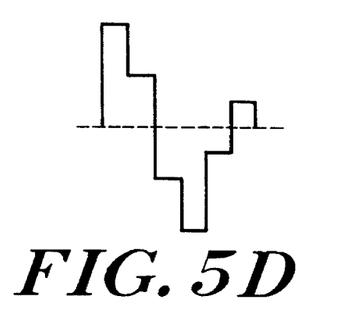
Figure 5E:
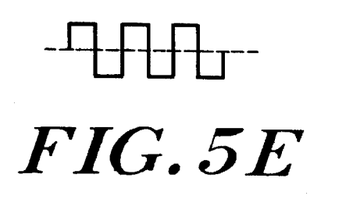
Figure 5F:
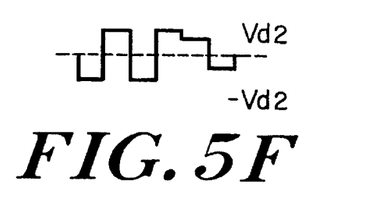
Figure 5G:
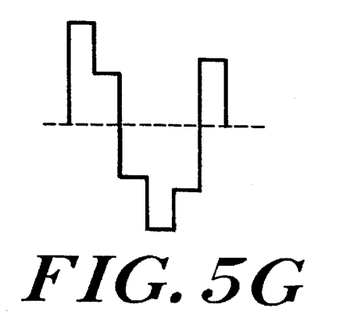
Figure 5H:
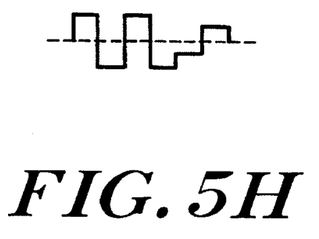

In turn, a ferroelectric liquid crystal 26 (Merck's SCE-8) was sandwiched between the substrates 21a and 21b, and then the substrates 21a and 21b were bonded together so that the rubbing direction of the substrate 21a oriented parallel to that of the substrate 21b, with a moderate temperature being applied thereto. Thus, the ferroelectric liquid crystal cell shown in FIG. 4(c) was completed. The entire area of thus fabricated liquid crystal cell was enclosed, and divided into regions A, B, C and D having areas of 22,500 μm², 3,800 μm², 1,600 μm² and 400 μm², respectively, with partition walls. When this ferroelectric liquid crystal cell was driven by voltage pulses of 10 V×150 μsec, 15 V×150 μsec, 30 V×150 μsec, and 50 V×150 μsec through the aforesaid direct-multiplexed driving method, an excellent five-scale gradational display was observed.

EXAMPLE 3

A ferroelectric liquid crystal display device was fabricated in accordance with the fabrication method described with reference to FIG. 1. As shown in the sectional view thereof in FIG. 2(a), an ITO film 2a with a thickness of about 1000 Å was formed on a glass substrate 1a, and then patterned into a striped configuration with a line width of about 160 μm through photolithography to form electrodes. The glass substrate 1a having the patterned ITO film 2a formed thereon was laminated with an $SiO_2$ insulation film 3a with a thickness of about 1.5 μm, thereafter a polyimide orientation film 4a (Chisso's PSI-A-2101) with a thickness of about 400 Å was applied on the $SiO_2$ insulation film 3a, and a rubbing treatment was made thereon.

In substantially the same manner as described above, an ITO film 2b with a thickness of about 1000 Å was formed on a glass substrate 1b, and patterned into a striped configuration through photolithography to form electrodes. Then, the glass substrate 1b having the patterned ITO film 2b formed thereon was laminated with an $SiO_2$ insulation film 3b with a thickness of about 0.1 μm, thereafter a polyimide orientation film 4b (Chisso's PSI-A-2101) with a thickness of about 400 Å was applied on the insulation film 3b, and a rubbing treatment was made thereon.

In turn, the substrates 1a and 1b were bonded together with a cell thickness of 2 μm so that the rubbing direction of the substrate 1a oriented parallel to that of the substrate 1b, and a ferroelectric liquid crystal composition comprising a ferroelectric liquid crystal (Merck's SCE-8) and photo-polymerization agent was sandwiched between the substrates 1a and 1b (the photo-polymerization agent was prepared by adding Merck's IRGCURE651 in a concentration of 0.5 wt % to a solution containing 10 wt % laurylacrylate and 10 wt % stearylacrylate dissolved in a solvent).

Then, light (12 mW/cm²) was exposed to the ferroelectric liquid crystal composition through a photomask A for 10 to 15 minutes to cure the photo-polymerization agent into a desired pattern, as shown in FIG. 2(b). Hence, partition walls were formed in portions exposed to the light, and the ferroelectric liquid crystal unexposed to the light remained as it was. Thus, the ferroelectric liquid crystal cell was completed.

The entire area of thus fabricated liquid crystal cell was enclosed, and divided into regions A, B, C and D having areas of 22,500 μm², 3,600 μm², 1,600 μm² and 400 μm² respectively, with partition walls. When this ferroelectric liquid crystal cell was driven by voltage pulses of 30 V×70 μsec, 30 V×100 μsec, 30 V×200 μsec, and 30 V×500 μsec through the aforesaid direct-multiplexed driving method, an excellent five-scale gradational display was observed.

As can be understood from the foregoing Examples, the ferroelectric liquid crystal display device of the present invention realizes a multi-scale gradational display by dividing each pixel into differently-sized partition areas with partition walls. Therefore, the liquid crystal display device can be more easily fabricated than the conventional liquid crystal display devices for area-division gradational display. Further, since electrodes are not divided, the configuration of the driving circuits is simplified, thereby reducing the cost. Still further, the liquid crystal display device of the present invention provides an excellent shock resistance, because the partition areas are defined by the partition walls.

What is claimed is:

1. A ferroelectric liquid crystal display device comprising:

a pair of substrates having respective electrodes formed on opposed surfaces thereof;

a ferroelectric liquid crystal sandwiched between the pair of substrates said ferroelectric liquid crystal consisting of only one kind of ferroelectric liquid crystal composition;

a pixel formed between the opposed electrodes, each pixel being formed by a pair of single electrodes; and partition walls formed on the electrodes and dividing the pixel into differently-sized partition areas.

2. A ferroelectric liquid crystal display device as set forth in claim 1, wherein all of said differently-sized partition areas are enclosed with partition walls.

3. A ferroelectric liquid crystal display device as set forth in claim 1, wherein the size of one pixel is between $10^2$ μm² and $10^6$ μm².

4. A ferroelectric liquid crystal display device as set forth in claim 3, wherein the size of one pixel is between 250 μm² and $10^5$ μm².

5. A ferroelectric liquid crystal display device as set forth in claim 1, wherein each pixel has a plurality of the differently-sized partition area where the maximum size is between $10^2$ μm² and $10^6$ μm² and the minimum size is between $10^2$ μm² and $10^5$ μm².

6. A ferroelectric liquid crystal display device as set forth in claim 1, wherein said partition walls comprise a film made of an inorganic compound selected from the group consisting of $SiO_2$, $SiN_x$, $Ta_2O_5$ and $Al_2O_3$.

7. A ferroelectric liquid crystal display device as set forth in claim I, wherein said partition walls comprise an organic film made of a polymer selected from the group consisting of epoxy resins, acrylic resins and novolak resins.

* * * * *